(12) United States Patent
Viswanathan

(10) Patent No.: US 6,924,756 B2
(45) Date of Patent: Aug. 2, 2005

(54) METHOD AND SYSTEM FOR PROCESSING A DIGITAL SIGNAL

(75) Inventor: Thayamkulangara Ramaswamy Viswanathan, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 78 days.

(21) Appl. No.: 10/447,972

(22) Filed: May 28, 2003

(65) Prior Publication Data

US 2004/0239537 A1 Dec. 2, 2004

(51) Int. Cl.[7] .............................. H03M 3/00; H03M 7/32
(52) U.S. Cl. ......................................... 341/143; 341/77
(58) Field of Search ........................ 341/143, 77, 141, 341/118, 120; 700/94; 704/500, 503, 504

(56) References Cited

U.S. PATENT DOCUMENTS

| | | | | | |
|---|---|---|---|---|---|
| 5,061,928 | A | * | 10/1991 | Karema et al. | 341/143 |
| 5,068,661 | A | * | 11/1991 | Kaneaki et al. | 341/143 |
| 5,153,593 | A | * | 10/1992 | Walden et al. | 341/143 |
| 5,181,032 | A | * | 1/1993 | Ribner | 341/143 |
| 5,414,424 | A | * | 5/1995 | Cabler | 341/143 |
| 5,760,722 | A | * | 6/1998 | Harris et al. | 341/143 |
| 6,061,007 | A | * | 5/2000 | Eastty et al. | 341/77 |
| 6,295,014 | B1 | * | 9/2001 | Eastty et al. | 341/143 |
| 6,356,872 | B1 | | 3/2002 | Leung et al. | 704/503 |
| 6,385,588 | B2 | | 5/2002 | Van der Vleuten | 704/504 |
| 6,438,434 | B1 | * | 8/2002 | Kamiya | 700/94 |
| 6,642,874 | B1 | * | 11/2003 | Lin et al. | 341/143 |
| 6,778,965 | B1 | * | 8/2004 | Bruekers et al. | 704/500 |
| 6,825,785 | B1 | * | 11/2004 | Huang et al. | 341/141 |
| 6,842,128 | B2 | * | 1/2005 | Koh | 341/143 |

* cited by examiner

*Primary Examiner*—Patrick Wamsley
(74) *Attorney, Agent, or Firm*—J. Dennis Moore; W. James Brady, III; Frederick J. Telecky, Jr.

(57) ABSTRACT

Processing signals to record media information includes receiving an analog signal at an analog-to-digital converter, where the analog signal includes media information. The analog-to-digital converter converts the analog signal to a corresponding digital signal, where the digital signal includes a first sequence having a first number of bits. A sigma-delta converter processes the digital signal according to a sigma-delta conversion, where the processed digital signal includes a second sequence having a second number of bits, and where the second number of bits is lower than the first number of bits. The processed digital signal is stored in a digital format in a medium in order to record the media information.

8 Claims, 1 Drawing Sheet

METHOD AND SYSTEM FOR PROCESSING A DIGITAL SIGNAL

TECHNICAL FIELD OF THE INVENTION

This invention relates generally to the field of signal processing and recording and more specifically to a system and method for processing a digital signal.

BACKGROUND OF THE INVENTION

Digital media players such as compact disk players typically perform digital signal processing. Known techniques often require a media player to perform complex digital signal processing of a digital signal in order to output an analog signal corresponding to the processed digital signal. These techniques, however, require outfitting every media player with a digital signal processor, which may add cost and complexity to the media player. Consequently, known techniques for processing digital signals may be unsatisfactory in certain situations.

SUMMARY OF THE INVENTION

In accordance with the present invention, disadvantages and problems associated with previous techniques for processing digital signals may be reduced or eliminated.

According to one embodiment, processing signals to record media information includes receiving an analog signal at an analog-to-digital converter, where the analog signal includes media information. The analog-to-digital converter converts the analog signal to a corresponding digital signal, where the digital signal includes a first sequence having a first number of bits. A sigma-delta converter processes the digital signal according to a sigma-delta conversion, where the processed digital signal includes a second sequence having a second number of bits, and where the second number of bits is lower than the first number of bits. The processed digital signal is stored in a digital format in a medium in order to record the media information.

Certain embodiments of the invention may provide one or more technical advantages. A technical advantage of one embodiment may be that by processing a digital signal before recording the signal in a medium may result in a simplified media player, thereby reducing cost and complexity.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Embodiments of the present invention and its advantages are best understood by referring to FIGS. 1 through 5 of the drawings, like numerals being used for like and corresponding parts of the various drawings.

Figure 1:
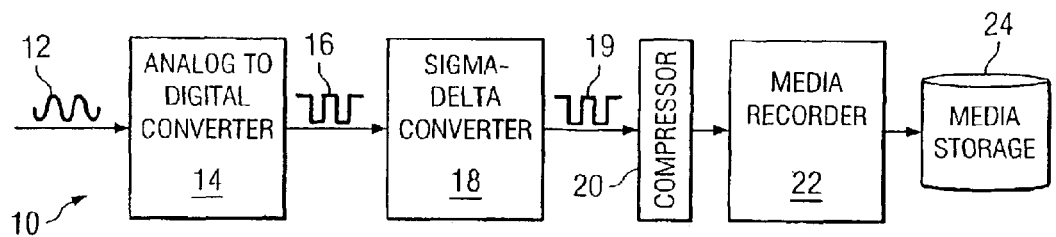
FIG. 1 is a block diagram of one embodiment of a system for processing a signal to record media information that may be used in accordance with the present invention.

FIG. 1 is a block diagram of one embodiment of a processing system 10 for processing a signal to record media information that may be used in accordance with the present invention. In general, processing system 10 processes analog signals using a sigma-delta converter 18 prior to recording at media storage 24. According to the illustrated embodiment, processing system 10 includes an analog-to-digital converter (ADC) 14, a sigma-delta converter 18, a media recorder 22, a compressor 20, and a media storage 24 coupled as shown in FIG. 1.

ADC 14 converts an analog signal 12 to a digital signal 16. For example, analog signal 12 comprising media information may be converted into digital signal 16 comprising the corresponding media information. The media information may include any information that may be recorded in a digital format. For example, analog signal 12 may include media information such as audio information, video information, audio-visual information, multi-media information, or any other suitable information that may be included at analog signal 12 and operable to be recorded in a digital format and played back. According to the illustrated embodiment, ADC 14 comprises a 16-bit analog-to-digital converter. It will be understood, however, that any other suitable analog-to-digital converter may be used to yield a digital signal having any suitable number of bits without departing from the scope of the invention.

Sigma-delta converter 18 receives digital signal 16 and converts the signal to a processed signal 19. According to the illustrated embodiment, sigma-delta converter 18 uses sigma-delta conversion techniques to convert digital signal 16 comprising a 16-bit word signal into processed signal 19 comprising a one-bit sequence. Processed signal 19 may comprise a multi-bit sequence or any other suitable sequence having any suitable number of bits without departing from the scope of the invention. For example, digital signal 16 comprising any suitable first number of bits may be converted into processed signal 19 comprising any suitable second number of bits, where the second number of bits is lower than the first number of bits. According to one embodiment, sigma-delta converter 18 may be included at a digital signal processor (DSP).

Sigma-delta converter 18 performs sigma-delta conversion. In general, a sigma-delta converter processes a signal to yield a bit sequence. According to the illustrated embodiment, sigma-delta converter 18 yields a one-bit sequence. Sigma-delta converter 18 may perform the sigma-delta conversion by calculating a quantization error signal corresponding to the received signal. The quantization error signal and the received signals are summed together. An integrator at sigma-delta converter 18 receives the quantization error signal summed with the received signal and generates an average of the summed signal, which is then quantized by a comparator. The quantization performed at the comparator of sigma-delta converter 18 yields the bit sequence corresponding to digital signal 16.

Although a basic sigma-delta conversion has been described, any other suitable sigma-delta conversion technique may be used without departing from the scope of the invention. For example, sigma-delta converter 18 may process a digital signal using a first order sigma-delta conversion, second order sigma-delta conversion, or any other suitable sigma-delta conversion technique. Additionally, sigma-delta converter 18 may yield any bit sequence having any suitable number of bits without departing from the scope of the invention.

Compressor 22 compresses processed signal 19. According to the illustrated embodiment, compressor 22 compresses the bit sequence of processed signal 19 to reduce the number of total bits corresponding to processed signal 19. Any suitable compression technique may be used by compressor 22 without departing from the scope of the invention. Compressor 22 sends processed signal 19 in a compressed format to media recorder 22 for further processing.

Media recorder 22 receives processed signal 19 and stores media information of processed signal 19 at media storage 24. According to the illustrated embodiment, processed signal 19 comprises media information corresponding to the media information of analog signal 12. Media recorder 22 may use any storing technique suitable for recording processed signal 19 at media storage 24 without departing from the scope of the invention. According to the illustrated embodiment, media storage 24 comprises a compact disk.

Modifications, additions, or omissions may be made to processing system 10 without departing from the scope of the invention. For example, compressor 20 may be omitted. As another example, although analog-to-digital conversion and sigma-delta conversion are described as occurring at separate modules, a digital signal processor (DSP) may perform both analog-to-digital conversion and sigma-delta conversion. Additionally, functions may be performed using any suitable logic comprising software, hardware, other logic, or any suitable combination of the preceding.

A block diagram of an embodiment of a system for retrieving media information that may be used in accordance with the present invention is described with reference to FIG. 2. A block diagram of one embodiment of a media player that may be used in accordance with the present invention is described with reference to FIG. 3. A flowchart demonstrating one embodiment of a method for processing a signal to record media information that may be used in accordance with the present invention is described with reference to FIG. 4. A flowchart demonstrating an embodiment of a method for retrieving media information that may be used in accordance with the present invention is described with reference to FIG. 5. As used in this document, "each" refers to each member of a set or each member of a subset of a set.

Figure 2:
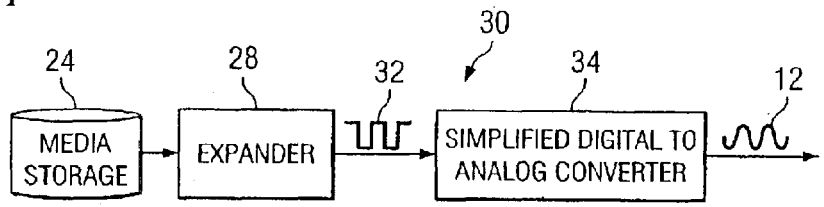
FIG. 2 is a block diagram of one embodiment of a system for retrieving media information that may be used in accordance with the present invention.

FIG. 2 is a block diagram of one embodiment of a retrieving system 30 for retrieving media information that may be used in accordance with the present invention. In general, retrieving system 30 receives the media information stored at media storage 24 and converts the media information to analog signal 12 using a digital-to-analog converter 34. According to the illustrated embodiment, retrieving system 30 includes a media storage 24, an expander 28, and a digital-to-analog converter (DAC) 34 coupled as shown in FIG. 2.

As was described with reference to FIG. 1, media storage 24 includes media information stored by media recorder 22. According to one embodiment, the media information stored at media storage 24 can be accessed by an input module of a media player 40, which will be described in more detail with reference to FIG. 3.

Expander 28 receives the media information in a digital format and expands it to yield the bit sequence signal 32. According to one embodiment, the media information may be stored in a compressed format, which expander 28 is operable to decompress. According to another embodiment, expanded bit sequence signal 32 may be substantially similar to processed signal 19. For example, if processed signal 19 comprises a one-bit sequence, expanded bit sequence signal 32 may comprise all or a portion of a one-bit sequence.

Simplified digital-to-analog converter (DAC) 34 receives bit sequence signal 32 and converts the signal to yield analog signal 12. According to the illustrated embodiment, simplified DAC 34 comprises a one-bit digital-to-analog converter. In one embodiment, a simplified DAC 34 may be defined as a delta-sigma modulator with a one-bit DAC. DAC 34 may perform a delta-sigma conversion of one-bit sequence signal 32 by calculating an error signal associated with a bit of bit sequence signal 32. DAC 34 may sum the error signal and the bit of the bit sequence signal 32 to yield a pulse train that may be further processed by a one-bit DAC, which may convert the pulse train into analog signal 12 by averaging analog signal 12 over time. Although a delta-sigma conversion with a one-bit DAC has been described, simplified DAC 34 may use any other suitable digital-to-analog conversion technique without departing from the scope of the invention.

Modifications, additions, or omissions may be made to retrieving system 30 without departing from the scope of the invention. For example, expander 28 may be omitted such as when processed signal 19 is not compressed prior to being stored at media storage 24. Additionally, functions may be performed using any suitable logic comprising software, hardware, other logic or any suitable combination of the preceding.

Figure 3:
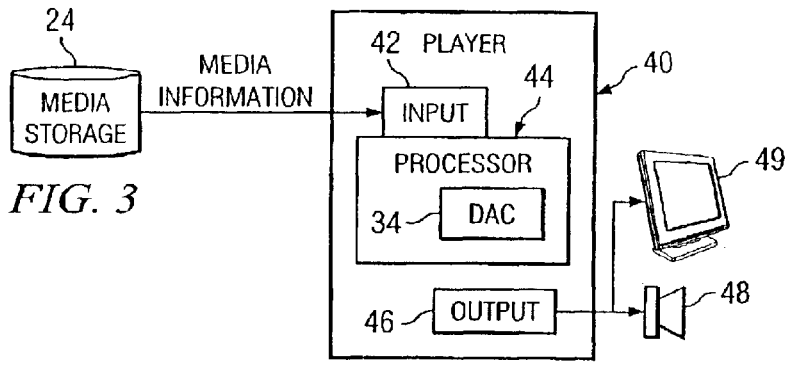
FIG. 3 is a block diagram of one embodiment of a media player that may be used in accordance with the present invention.

FIG. 3 is a block diagram of one embodiment of a media player 40 that may be used in accordance with the present invention. According to the illustrated embodiment, media player 40 includes an input module 42, a processor 44, and an output module 46 coupled as shown in FIG. 3.

According one embodiment, input module 42 accesses and retrieves stored media information from media storage 24, and forwards the media information to processor 44 for processing. Processor 44 includes a digital-to-analog converter (DAC) 34. As was described with reference to FIG. 2, DAC 34 converts bit sequence signal 32 to an analog output that output module 46 may use to generate at least an audio portion of analog signal 12.

Output module 46 receives the analog output and supplies it to a speaker 48, a display 49, either or both. According to one embodiment, output module 46 may amplify at least an audio portion of the audio signal. According to another embodiment, output module 46 may also convert the analog output to analog signal 12. Similarly, output module 46 may amplify at least a video portion of a video signal.

Speaker 48 receives the amplified analog output and converts at least the audio portion of the audio signal to sound. Although a speaker 48 has been described, any device suitable for processing the analog output may be used. For example, output module 46 may supply an analog output to a storage device, a processor, or any other suitable device for processing an analog output.

Display 49 may receive the amplified analog output and convert at least a video portion of a video signal into an image. For example, display 49 may receive an amplified video signal comprising media information corresponding to medical information such as an X-ray, EKG, or any other suitable image. Display 49 and speaker 48 may receive the amplified analog output substantially simultaneously, at intervals, in the alternative, or in any other suitable arrangement without departing from the scope of the invention. For example, speaker 48 may receive at least the audio portion, while display 49 receives at least the video portion. As another example, speaker 48 may receive at least the audio portion, while display 49 does not receive any output.

Modifications, additions, or omissions may be made to media player 40 without departing from the scope of the invention. For example, an expander 28 may be added at processor 44. As another example, display 49 may be omitted. As yet another example, media player 40 may include an internal media storage such as a memory that may be used to store data corresponding to the audio output, video output, bit sequence signal 32, or any other signal, output, or sequence processed or otherwise at media player 40. For example, a memory at media player 40 may be used to store a processed video output, which may be accumulated and forwarded to display 49 for display. Any additional modules, processors, and software may be included at media player 40 without departing from the scope of the invention. Additionally, functions may be performed using any suitable logic comprising software, hardware, other logic or any suitable combination of the preceding.

In summary, media player 40 accesses and retrieves media information stored as a one-bit sequence. Media player 40 processes the one-bit sequence using a one-bit DAC 34 to output the analog signal comprising the media information. By processing digital signal 16 prior to storing it, a less costly and less complex media player 40 may be used to retrieve the stored media information.

Figure 4:
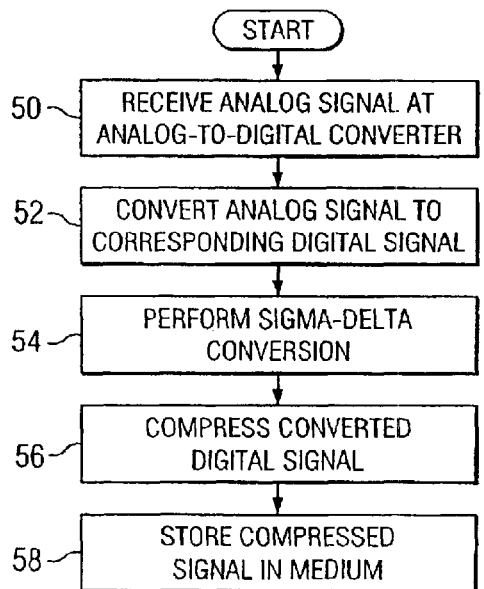
FIG. 4 is a flowchart demonstrating one embodiment of a method for processing a signal to record media information that may be used in accordance with the present invention.

FIG. 4 is a flowchart demonstrating one embodiment of a method for processing a signal to record media information that may be used in accordance with the present invention. The method begins at step 50, where analog-to-digital converter 14 receives analog signal 12. At step 52, analog-to-digital converter 14 converts analog signal 12 into corresponding digital signal 16.

The method proceeds to step 54, where sigma-delta converter 18 performs sigma-delta conversion of digital signal 16. According to the illustrated embodiment, sigma-delta converter 18 uses a sigma-delta conversion technique to convert digital signal 16 into a one-bit sequence.

At step 56, a compressor may convert the converted digital signal comprising the one-bit sequence. Because sigma-delta conversion may increase the amount of data corresponding to analog signal 12, compressing the one-bit sequence may reduce the size of the data associated with the one-bit sequence prior to storing the sequence in a medium.

The method proceeds to step 58, where media recorder 22 stores the compressed signal in a medium. According to the illustrated embodiment, the compressed signal may be stored at a media storage 24 comprising a compact disk. Any other suitable media storage 24 may be used without departing from the scope of the invention. For example, media storage 24 may include a digital video disk (DVD), a digital tape, an optical disk, or any other suitable media that may store content in a digital format. After storing the compressed signal in a medium, the method terminates.

Steps may be added, omitted, modified, or performed in any suitable order without departing from the scope of the invention. For example, compressing converted digital signal at step 56 may be omitted.

Figure 5:
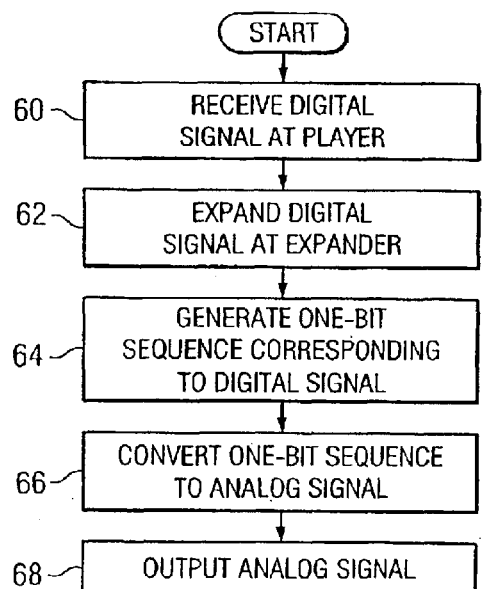
FIG. 5 is a flowchart demonstrating one embodiment of a method for retrieving media information that may be used in accordance with the present invention.

FIG. 5 is a flowchart demonstrating one embodiment of a method for retrieving media information that may be used in accordance with the present invention. The method begins at step 60, where media player 40 receives a digital signal. According to one embodiment, media player 40 receives the digital signal at input module 42 of media player 40. At step 62, expander 28 of media player 40 expands the digital signal.

The method proceeds to step 64, where processor 44 generates a one-bit sequence corresponding to the digital signal. According to the illustrated embodiment, if the digital signal is stored in a compressed format, expander 28 may decompress the compressed signal to yield the one-bit sequence corresponding to the digital signal. Processor 44 may generate the one-bit sequence corresponding to the digital signal in order for DAC 34 to convert the one-bit sequence to an analog signal at step 66. DAC 34 converts the one-bit sequence to an analog signal, as was more particularly described with reference to FIG. 2.

At step 68, output module 46 outputs an analog signal to a speaker 48 that may convert the analog signal to an audio format. After outputting the analog signal at step 68, the method terminates.

Steps may be added, omitted, modified, or performed in any suitable order without departing from the scope of the invention. For example, expanding the digital signal at expander 28 of media player 40 at step 62 may be omitted. As another example, expanding the digital signal at expander 28 of media player 40 at step 62 may be performed substantially simultaneously with generating the one-bit sequence corresponding to the digital signal at step 64. As yet another example, a step may be added where the output module 46 amplifies the analog output and supplies the amplified analog output to speaker 48.

Certain embodiments of the invention may provide one or more technical advantages. A technical advantage of one embodiment may be that by processing a digital signal before recording the signal in a medium may result in a simplified media player, thereby reducing cost and complexity.

Although an embodiment of the invention and its advantages are described in detail, a person skilled in the art could make various alterations, additions, and omissions without departing from the spirit and scope of the present invention as defined by the appended claims.

What is claimed is:

1. A method for processing a signal to record media information, comprising:

receiving an analog signal at an analog-to-digital converter, the analog signal comprising media information;

converting the analog signal to a corresponding digital signal at the analog-to-digital converter, the digital signal comprising a first sequence having a width of a first number of bits;

processing the digital signal in accordance with a sigma-delta conversion at a sigma-delta converter to yield a processed digital signal, the processed digital signal comprising a second sequence having a width of a second number of bits, the second number of bits being lower than the first number of bits; and storing the processed digital signal in a digital format in a medium in order to record the media information.

2. The method of claim 1, further comprising compressing the processed digital signal prior to storing the processed digital signal in the digital format.

3. The method of claim 1, wherein the second number of bits comprises a one-bit sequence.

4. A system for processing a signal to record media information, comprising:
- an analog-to-digital converter operable to:
  - receive an analog signal, the analog signal comprising media information;
  - convert the analog signal to a corresponding digital signal, the digital signal comprising a first sequence having a first number of bits;
- a sigma-delta converter coupled to the analog-to-digital converter and operable to process the digital signal in accordance with a sigma-delta conversion, the processed digital signal comprising a second sequence having a second number of bits, the second number of bits being lower than the first number of bits; and
- a media recorder coupled to the sigma-delta converter and operable to store the processed digital signal in a digital format in a medium in order to record the media information.

5. The system of claim 4, further comprising a compressor coupled to the sigma-delta converter and operable to compress the processed digital signal prior to storing the processed digital signal in the digital format.

6. The system of claim 4, the second sequence comprising a one-bit sequence.

7. A system for processing a signal to record media information, comprising:
- means for receiving an analog signal, the analog signal comprising media information;
- means for converting the analog signal to a corresponding digital signal, the digital signal comprising a first sequence having a width of a first number of bits;
- means for processing the digital signal in accordance with a sigma-delta conversion to yield a processed signal, the processed digital signal comprising a second sequence having a width of a second number of bits, the second number of bits being lower than the first number of bits; and
- means for storing the processed digital signal in a digital format in a medium in order to record the media information.

8. A system for processing a signal to record media information, comprising:
- an analog-to-digital converter operable to:
  - receive an analog signal, the analog signal comprising media information; and
  - convert the analog signal to a corresponding digital signal, the digital signal comprising a plurality of words;
- a sigma-delta converter coupled to the analog-to-digital converter and operable to process the digital signal in accordance with a sigma-delta conversion to yield a processed digital signal, the processed digital signal comprising a one-bit sequence, the sigma-delta converter further operable to:
  - receive the digital signal at a digital signal processor;
  - calculate an error signal corresponding to the received digital signal;
  - sum the error signal with the received digital signal to yield a summed signal; and
  - compare the received digital signal with the summed signal to yield the one-bit sequence;
- a compressor coupled to the sigma-delta converter and operable to compress the processed digital signal prior to storing the processed digital signal in a digital format; and
- a media recorder coupled to the compressor and operable to store the processed digital signal in the digital format in a medium in order to record the media information, the medium comprising a compact disk.

* * * * *